United States Patent
Natali

(10) Patent No.: US 10,053,981 B2
(45) Date of Patent: Aug. 21, 2018

(54) SELECTION OF OPTIMAL HYDRATE INHIBITOR SURFACTANTS FOR USE IN OIL AND GAS OPERATIONS

(71) Applicant: Halliburton Energy Services, Inc., Houston, TX (US)

(72) Inventor: Sanja Natali, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 342 days.

(21) Appl. No.: 14/781,072

(22) PCT Filed: Dec. 31, 2014

(86) PCT No.: PCT/US2014/072937
§ 371 (c)(1),
(2) Date: Sep. 29, 2015

(87) PCT Pub. No.: WO2016/108870
PCT Pub. Date: Jul. 7, 2016

(65) Prior Publication Data
US 2016/0319663 A1 Nov. 3, 2016

(51) Int. Cl.
*G01V 1/40* (2006.01)
*E21B 49/08* (2006.01)
(Continued)

(52) U.S. Cl.
CPC .............. *E21B 49/086* (2013.01); *C09K 8/52* (2013.01); *E21B 43/34* (2013.01); *C09K 2208/22* (2013.01); *E21B 2049/085* (2013.01)

(58) Field of Classification Search
CPC .. E21B 49/086; E21B 43/34; E21B 2049/085; C09K 8/52; C09K 2208/22
(Continued)

(56) References Cited

U.S. PATENT DOCUMENTS

| 3,630,953 A | 12/1971 | Whittier et al. |
| 7,033,504 B1 * | 4/2006 | Blytas .................. B01D 17/047 166/267 |

(Continued)

FOREIGN PATENT DOCUMENTS

WO 2013053036 A1 4/2013

OTHER PUBLICATIONS

International Search Report and Written Opinion for PCT/US2014/072937 dated Sep. 14, 2015.
(Continued)

*Primary Examiner* — Stephanie Bloss
(74) *Attorney, Agent, or Firm* — McDermott Will & Emery LLP

(57) ABSTRACT

Methods including producing a bulk fluid from a subterranean formation, the bulk fluid comprising at least water and a hydrocarbon, and having certain constituent parameters; sampling a portion of the bulk fluid, thereby forming at least one sampled fluid; determining constituent parameters of the sampled fluid using the hydrophilic-lipophilic deviation (HLD) model; and determining an optimal hydrate inhibitor surfactant (HIS) or HIS mixture to achieve a first oil-water separation morphological phase of the sampled fluid at temperatures above about 10° C. and a first water-in-oil morphological phase of the sampled fluid at temperatures below about 5° C.

20 Claims, 2 Drawing Sheets

(51) Int. Cl.
*C09K 8/52* (2006.01)
*E21B 43/34* (2006.01)
(58) Field of Classification Search
USPC .............................................................. 702/6
See application file for complete search history.

(56) References Cited

U.S. PATENT DOCUMENTS

| | | | |
|---|---|---|---|
| 7,856,848 B2* | 12/2010 | Lu | C10L 3/10 |
| | | | 62/623 |
| 8,357,639 B2 | 1/2013 | Quintero et al. | |
| 2008/0064611 A1* | 3/2008 | Spratt | C09K 8/52 |
| | | | 507/90 |
| 2008/0108527 A1 | 5/2008 | Varadaraj | |
| 2008/0302531 A1* | 12/2008 | Berger | C09K 8/584 |
| | | | 166/270.1 |
| 2010/0099814 A1* | 4/2010 | Conrad | C08F 220/56 |
| | | | 524/555 |
| 2010/0193194 A1* | 8/2010 | Stoisits | E21B 37/06 |
| | | | 166/335 |
| 2013/0096036 A1 | 4/2013 | Quintero et al. | |

OTHER PUBLICATIONS

Evaluating the Hydrophilic-Lipophilic Nature of Asphaltenic Oils and Naphthenic Amphiphiles Using Microemulsion Models, J. Colloid and Interface Science 336, 2009, 304.
Microemulsion Formation with Mixed Chlorinated Hydrocarbon Liquids, J. Colloid Interface Sci 168, 1994, 67.
The Characteristic Curvature of Ionic Surfactants, J. Surfact Deterg 11, 2008, 145.

* cited by examiner

SELECTION OF OPTIMAL HYDRATE INHIBITOR SURFACTANTS FOR USE IN OIL AND GAS OPERATIONS

BACKGROUND

The present disclosure generally relates to oil and gas operations and, more particularly, the selection of optimal hydrate inhibitor surfactants for use during oil and gas operations.

The production of underground hydrocarbons often requires substantial investment in drilling and pumping equipment. When production is underway, up-front costs can be recouped provided that operating costs remain low enough for the sale of oil and/or gas to be profitable. Additionally, midstream and downstream processing costs of produced hydrocarbons (i.e., oil and natural gas, which may collectively be referred to herein simply as "oil") may affect the profitability of the produced hydrocarbons. Gas hydrate production in cold climates, in deepwater environments, or at any point during hydrocarbon production may interfere with this profitability.

Gas hydrates are a form of a unique class of chemical compounds known as clathrates. They are characterized by a rigid, open network of bonded host molecules that enclose, without direct chemical bonding, appropriately sized guest molecules of another substance. For example, in the case of gas hydrates a crystalline water molecule acts as the host molecule, which forms a "cage" around a smaller hydrocarbon molecule (e.g., methane), thereby yielding ice-like crystals of gas and water. These gas hydrates tend to adhere to each other, resulting in large ice-like crystals formed on the surface of hydrocarbon conduits that act as blockades ("gas hydrate plugs"). Accordingly, during production, storage, and transportation (e.g., pipelines) of hydrocarbons, the formation of gas hydrates may interfere with hydrocarbon production flow, which can block tubings, flow lines, pipelines, and other conduits (e.g., drill strings) through which produced hydrocarbons are intended to flow.

Various methods have been employed for inhibiting gas hydrate formation. For example, the traditional approach to gas hydrate inhibition and/or dissolution after formation involves the addition of sufficient quantities of a gas hydrate inhibitor surfactants (e.g., a thermodynamic gas hydrate inhibitor surfactants) to a production system (e.g., downhole, in a pipeline, and the like). Although the term "gas hydrate inhibitor surfactant" is used herein, such substances are also known as anti-agglomerates, and will be understood to be interchangeable. Determining the optimal type and concentration, or mixtures thereof of gas hydrate inhibitor surfactants is typically determined using rocking cell apparatus methodologies, which are performed in laboratory settings. In some instances, the rocking cell apparatus methodologies may be time consuming and may limit analysis to only single gas hydrate types at a time.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
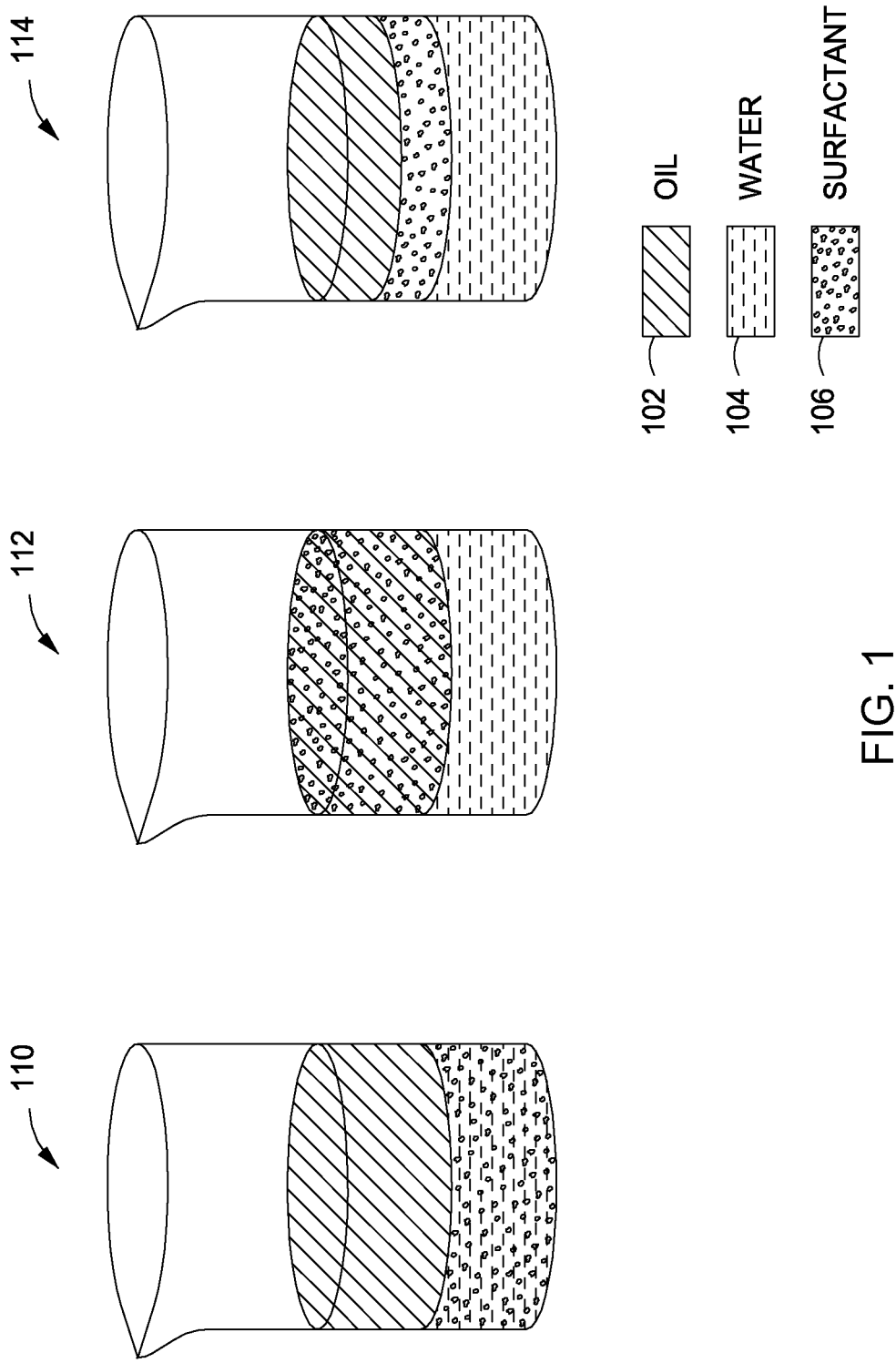
FIG. 1 provides an illustration of the morphological phases of an oil-water system, according to one or more embodiments of the present disclosure.

The present disclosure generally relates to oil and gas operations and, more particularly, the selection of optimal hydrate inhibitor surfactants (HIS) for use during oil and gas operations. More specifically, the systems and methods described herein employ the hydrophilic-lipophilic deviation (HLD) model synergistically with the Net-Average Curvature (NAC) model to identify optimal HISs for use in a production system to inhibit or otherwise reduce the formation of gas hydrates. As used herein, the term "production system" encompasses the subterranean formation from which the hydrocarbon is extracted, the equipment used in the extraction process, and downstream processing equipment used to transport, store, and process the hydrocarbon. Such equipment encompasses both subsurface and surface equipment (e.g., tubing, pipelines, storage vessels, valves, nozzles, pumps, screens, and the like). The production system, accordingly, involves the formation and equipment that contacts the hydrocarbon. As used herein, the term "subterranean formation," or simply "formation," refers to any material (e.g., rock) under the surface of the earth, encompassing both areas below exposed earth and areas below earth covered by water (e.g., ocean water or fresh water). A "wellbore" may be any opening in a subterranean formation, such as an opening for recovering produced hydrocarbons. As used herein, the term "substantially" means largely, but not necessarily wholly.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques. As used herein, the term "about" with reference to numerical quantities may mean ±5% of a stated numerical value, encompassing any value and subset therebetween.

One or more illustrative embodiments are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

The systems and methods of the present disclosure, as discussed above, utilize the hydrophilic-lipophilic deviation ("HLD") model, in combination with the Net-Average Curvature (NAC) model to select one or more HISs for use in inhibiting gas hydrate formation in a production system. The HLD model quantifies the relative impact of the hydrophilic-lipophilic nature of oils and surfactants on the morphological phase behavior of an emulsion fluid comprising oil, water, and surfactant. The NAC model is also used to predict the phase behavior of emulsions, but accounts for the concentration of surfactant therein. That is, the NAC component of the systems and methods described herein is a scaling model that permits optimization of a selected HIS or mixture of HISs (i.e., mixtures of different types of HISs) for use in inhibiting gas hydrate formation in a production system.

The systems and methods described herein allow rapid determination of optimal HIS or mixtures of HISs, which may be pre-selected to significantly reduce time associated with traditional laboratory techniques, which may also be employed using the systems and methods of the present disclosure. Additionally, the systems and methods described herein permit selection of HIS or mixtures of HISs that take into account profitability, environmental impact, availability (e.g., commodity chemicals v. specialty chemicals that are significantly higher in cost), water management, and the like. Correlating the selected optimal HIS and HISs to field conditions also permits future optimization, which may be achieved after a reduced period of time or with reduced experimentation, and allows adjustments to be made in the field during real-time operations to ensure continued optimal performance gas hydrate inhibition in the production system. For example, the HIS or mixture of HISs may be adjusted on-the-fly at any point in the production system. As used herein, the term "on-the-fly" refers to performing an operation during a subterranean treatment that does not require stopping normal operations. In combination, these advantages may permit formation of a library of novel HIS and HIS mixtures that can be characterized based on a variety of field parameters including, but not limited to, formation type and location (e.g., environmental regulations in the North Sea), temperature, produced hydrocarbon type, pipeline type, availability of raw materials, and the like.

Accordingly, the systems and methods of the present disclosure may allow customization and optimization of HIS and HIS mixtures at with increased identification time compared to traditional techniques, result in cost savings by reducing costly trial and error composition testing of HIS and HIS mixtures employed by traditional techniques, lower the cost of gas hydrate inhibition efforts due to rapid and optimal selection of HIS and HIS mixtures based not only on their gas hydrate inhibition effects, but also costs concerns, availability concerns, and the like.

As shown in FIG. 1, three (3) morphological phases may exist when a surfactant 106 (e.g., a HIS or HIS mixture) is added to a fluid comprising comingled oil 102 and water 104 (an "oil-water fluid"), each associated with a relative HLD value, discussed in detail below. As used herein, the term "oil-water-surfactant system," (or "O/W/S system"), may be used to describe an oil-water system having a surfactant added therein. The morphological phases include an oil-in-water morphological phase 110, a water-in-oil morphological phase 112, and an oil-water separation morphological phase 114. The oil-in-water morphological phase 110, also referred to as a "Winsor Type I" emulsion (including micro- and nano-emulsions) is characterized by a water 104 and surfactant 106 emulsion, leaving an excess oil 102 phase. The water-in-oil morphological phase 112, also referred to as a "Winsor Type II" emulsion (including micro- and nano-emulsions) is characterized by an oil 102 and surfactant 106 emulsion, leaving an excess water 104 phase. Finally, the oil-water separation morphological phase 114, also referred to as a "Winsor Type III" emulsion (including micro- and nano-emulsions), is characterized by a three-phase separation in which the surfactant 106 is located at the face between the oil 102 and water 104. It will be appreciated by one of skill in the art that some intermixing between the surfactant 106, the oil 102, and the water 104 occurs at each morphological phase type. For example, in the oil-water separation morphological phase, some intermixing between the surfactant 106 and the oil 102 and water 104 may occur at the face therebetween.

Achieving each of the oil-in-water morphological phase 110, the water-in-oil morphological phase 112, and the oil-water separation morphological phase 114 may be dependent on the type of surfactant 106 selected, the type of oil in the oil-water system, the salinity of the water 104 in the oil-water system, the temperature of the in the O/W/S system, and the like, as described in detail below.

In the embodiments described herein, during operating conditions at a subsurface location (e.g., downhole, pipeline, and the like) in the production system gas hydrate formation may be problematic at temperatures below about 5° C. (referred to herein as "operating temperatures"). Additionally, during these operating conditions, the hydrocarbon fluid (which may naturally include oil and surfactant) may be under flowing conditions. As used herein, the term "flowing" refers to circulation or movement of a fluid within a production systems as described herein. As used herein, the term "fluid" refers to both liquid and gas phase substances. Under such operating temperatures, the hydrocarbon fluid is preferably in a water-in-oil morphological phase 112 (FIG. 1), where agglomeration of any formed gas hydrate crystals may be reduced or prevented due to the morphological phase properties. In some instances, without being limited, the operating temperatures of the present disclosure may be between a upper limit of about 5° C., 0° C., −5° C., and −10° C. and an lower limit of about −25° C., −20° C., −15° C., and −10° C., encompassing any value and subset therebetween. At non-operating temperatures (e.g., at surface locations) above about 10° C. (referred to herein as "non-operating temperatures), hydrocarbon fluids may be static (i.e., not flowing), such as in storage vessels as part of the production system and may preferably in an oil-water separation morphological phase 114 (FIG. 1), such that the oil and water may be separate from one another. In some instances, without being limited, the non-operating temperatures of the present disclosure may be between a lower limit of about 10° C., 15° C., 20° C., 25° C., and 30° C. and an upper limit of about 50° C., 45° C., 40° C., 35° C., and 30° C., encompassing any value and subset therebetween.

A hydrocarbon fluid may be sampled from a location in a production system and the components of the hydrocarbon fluid may be determined initially before the type and amount of HIS or HIS mixture may be determined for achieving the above morphological phases and before using the optimization techniques described herein. The components of the hydrocarbon fluid may be determined using the HLD model, as provided below. The HLD of a hydrocarbon fluid will be explained in terms of an O/W/S system, wherein the hydrocarbon fluid comprises an O/W/S system, which may naturally include oil, water, and a surfactant (which may be natural or included as a result of treatment fluids introduced into a formation during a particular operation), or which may have such constituents added thereto for the purposes of calculating the HLD. An O/W/S system is dependent on the type and amount of surfactant used, which results in a particular morphological phase (FIG. 1).

For ionic surfactants, the HLD may be calculated using Equation 1, below; for nonionic surfactants, the HLD may be calculated using Equation 2, below:

$$HLD=\ln(S)-k*EACN+c_c-\alpha_T(T-25° C.)+f(A) \quad \text{Equation 1}$$

$$HLD=b(S)-k*EACN+c_{cn}-c_T(T-25° C.)+f(A) \quad \text{Equation 2,}$$

where S is the salinity of the water of the an O/W/S system (g/100 mL water), with log dependency in Equation 1; b is a salinity constant equivalent for nonionic surfactants (unitless); EACN is the equivalent alkane carbon number for the oil of the O/W/S system (unitless), which reflects the oil hydrophobicity based on the number of carbons in the oil or the equivalent number of carbons; T is temperature (° C.) of the O/W/S system at the point where the surfactant is to be added to the oil-water system; $f(A)$ is a function of alcohol (or co-solvent) type and concentration in the O/W/S system (unitless); k is a surfactant constant, which depends on the type of surfactant head group (unitless); $c_c$ is the characteristic curvature (i.e., surfactant hydrophilic-lipophilic nature) for an ionic surfactant (unitless); $c_{cn}$ is the characteristic curvature (i.e., surfactant hydrophilic-lipophilic nature) for a nonionic surfactant (unitless), which reflects the nonionic surfactant hydrophobicity; $\alpha_T$ is a surfactant temperature constant for ionic surfactants (1/° C.), which reflects the ionic surfactant hydrophobicity; and $c_T$ is a surfactant temperature constant for nonionic surfactants (1/° C.). Each of b, k, $\alpha_T$, and $c_T$ are constants of fixed value depending on the particular type of surfactant Accordingly, the HLD model takes into consideration salinity, temperature, alcohol content, and characteristics of the hydrophobicity and type of oil and surfactant (i.e., "HLD parameters"). In practice applications, produced oil-water systems (i.e., produced fluid from a subterranean formation comprising oil and water) typically do not include an alcohol content. Accordingly, the method of the present disclosure may use the HLD model based on Equation 3, pertaining to ionic surfactants, and Equation 4, pertaining to nonionic surfactants, below:

$$HLD=\ln(S)-k*EACN+c_c-\alpha_T(T-25° C.) \quad \text{Equation 3}$$

$$HDL=b(S)-k*EACN+c_{cn}-c_T(T-25° C.) \quad \text{Equation 4.}$$

Based on Equation 3 and Equation 4, as salinity, S, increases, the HLD value also increases. As the EACN value increases the HLD decreases. The surfactant temperature constants may be positive or negative. Accordingly, for example, the ionic surfactant temperature constant may be about 0.01, such that as the temperature, T, increases above the reference value of 25° C., the HLD decreases. On the other hand, for example, the nonionic surfactant temperature constant of an ethoxylate surfactant may be about −0.06, such that as the temperature, T, increases above the reference value of 25° C., the HLD increases. Additionally, as the characteristic curvature of the ionic surfactant, $c_c$, or the nonionic surfactant, $c_{cn}$, increases, the HLD also increases.

The HLD value produced by Equation 3 or Equation 4, depending on the type of surfactant used, predicts the morphological phase of a water-oil system. Referring again to FIG. 1, when the HLD value is equal to zero (0), the oil-water separation morphological phase 114 is achieved and represents separation of the oil 102 and water 104 phases. As the HLD decreases to values less than zero (0), a water-oil system comprising a surfactant will adopt the oil-in-water morphological phase 110; whereas as the HLD increases to values greater than zero (0), the water-oil system comprising a surfactant will adopt the water-in-oil morphological phase 112.

In the embodiments herein, the HLD model is used to determine the constituent parameters of a produced hydrocarbon fluid by setting the HLD model to 0. Because the salinity of the produced hydrocarbon may be determined using known analytical techniques, the EACN of the hydrocarbon fluid may be first determined, followed by determination of the remaining constituent parameters. It should be noted, however, that the constituent parameters of the hydrocarbon fluid may be determined by first determining any other parameter in the HLD formula (e.g., characteristic curvature), without departing from the scope of the present disclosure. However, the examples of determining HLD according to the present disclosure, although non-limiting, are provided with reference to first determining an unknown EACN value for a specific type of hydrocarbon fluid ("oil") for illustrative purposes.

The EACN value is specific for each type of oil, and explains the hydrophobicity of the oil. The EACN for alkane oils may be equivalent to the number of carbons atoms in the oil molecule. However, for other oil types, the number of carbon atoms alone may not predict the EACN of the oil, or the oil's hydrophobicity. The EACN of an oil may be determined experimentally where the HLD value =0, representing an oil-water separation morphological phase 114 (FIG. 1) by using known values for the remaining variables in either Equation 1 or Equation 2. The temperature variable, T, may be controlled at temperature 25° C., such that the variable is effectively no longer taken into account in determining the EACN value. Similarly, the salinity, S, may be effectively removed as a variable for determining HLD by using a known salinity and measuring the salinity using known techniques (e.g., a conductivity meter, a refractometer, a hydrometer, and the like).

In one instance, the EACN may be determined by using at least two known surfactants having a characteristic curvature and a known salinity based on the relative combination of the known surfactants ("surfactant-surfactant method"). In some instances, use of a two or more of known ionic surfactants in varying concentrations and proportions to one another may cover a wider range of curvature values, which may be preferred to experimentally determining the EACN of a particular O/W/S system. The selected known surfactants should preferably not include surfactants that form complex phases between each other, should preferably be relatively compatible with oil-water systems generally produced from formations, and the like. The characteristic curvature of a mixture of surfactants is determined based on a linear relationship of the added surfactant types, based on Equation 5 for ionic surfactants, and Equation 6 for nonionic surfactants, as follows:

$$C_{c-mix}=\Sigma_i y_i C_{c_i} \quad \text{Equation 5,}$$

$$C_{cn-mix}=\Sigma_i y_i C_{cn_i} \quad \text{Equation 6,}$$

where $y_i$ is the fraction of the $i^{th}$ surfactant component (unitless) (e.g., 0.25 if that surfactant component makes up 25% of the surfactant composition); $C_{c_i}$ is the characteristic curvature of the $i^{th}$ ionic surfactant component; and $C_{cn_i}$ is the characteristic curvature of the $i^{th}$ nonionic surfactant component.

In another instance, the EACN may be determined using at least one known surfactant (e.g., known characteristic curvature) and at least one known oil component (e.g., known EACN), to be included in the O/W/S system in addition to the already present oil component ("surfactant-oil method"), each in varying concentrations and proportions to one another. The ratios of the different oils may be adjusted until the HLD value=0, and the EACN of the known and unknown oil mixture is elucidated. Thereafter, the EACN of the unknown oil may be calculated. The EACN value of a mixture of oils is determined based on a linear relationship of the added oil types, based on Equation 7, as follows:

$$EACN_{mix} = \Sigma_i x_i EACN_i \qquad \text{Equation 7,}$$

where $x_i$ is the fraction of the $i^{th}$ oil component (e.g., the unknown oil component) (unitless); and $EACN_i$ is the EACN of the $i^{th}$ oil component (e.g., the unknown oil component).

The EACN of an unknown oil in an O/W/S system may additionally be determined using the HLD model described herein using a known surfactant (e.g., known characteristic curvature) and a known range of salinities (e.g., range of salinity concentrations), S, such as by adding a salt to the O/W/S system or by diluting the O/W/S system with water ("salinity method"). Use of an ionic surfactant, in such instances, may permit a greater range of salinities to be evaluated, but it may be necessary to also take into account the salinity of the ionic surfactant itself. In some embodiments, it may be preferred to select a surfactant that can withstand very high salinities to more accurately determine the EACN of the unknown oil.

In each of the above methods, the surfactant-surfactant method, the surfactant-oil method, and the salinity method, a variety of concentrations and/or types of the known constituent parameters may be included in a series of identical O/W/S systems, so as to enhance the ability to accurately determine the EACN of the particular system. That is, an O/W/S/ system may be aliquoted by any means suitable into two or more testing tubes and the parameters are varied until the formation of an oil-water separation morphological phase 114 (FIG. 1) occurs in at least one of the testing tubes, indicating an HLD=0. Moreover, any of these methods and any other methods employed for determining the constituent parameters of a produced hydrocarbon fluid may be automated, without departing from the scope of the present disclosure.

Once the EACN of an unknown oil in an O/W/S system is known, other unknown parameters may be calculated based on the know parameters and known EACN, thereby enabling determination of the HIS characteristics detailed in the HLD model for achieving a desired HLD value relative to 0. Accordingly, with the known HIS qualities required, a HIS or HIS mixture and dosage thereof may be selected to achieve the desired HLD value and morphological phase, of the oil-water system originally tested (i.e., the produced hydrocarbon fluid).

As described previously, the desired HLD value for the HIS and HIS mixtures of the present disclosure is such that HLD>0 at operating temperatures and HLD=0 at non-operating temperatures, where the temperature is based on the temperature that a produced hydrocarbon fluid is exposed. Although ideally the HLD=0 at room temperature to achieve an oil-water separation morphological phase, it will be appreciated that in some instances, the oil-water separation morphological phase may be achieved at an HLD ranging from +/−1, preferably +/−0.5, more preferably +/−0.3, encompassing any value and subset therebetween. By way of example a system of water, SDHS (sodium dihexylsulfosuccinate), and toluene may be considered acceptable if the system achieves an HLD of from −0.2 to 0.3. Similarly, although HLD>1 may preferably be above about +0.3, it may also be above about +0.5, above about +1, above about +2, above about +3, above about +4, and typically no greater than +5, encompassing any value and subset therebetween.

Often, as previously discussed, at operating temperatures, the produced hydrocarbon may be flowing (e.g., during production); whereas at non-operating temperatures the produced hydrocarbon fluid may be static (e.g., in a stored state). Accordingly, the selection of the type and amount of HIS or HIS mixtures to include in a produced hydrocarbon fluid may achieve both HLD values depending on the temperature requirements, as calculated using the HLD model and the now-known constituent parameters of the produced hydrocarbon fluid. Additionally, the type of HIS(s), dosage, and the like to achieve the two desired HLD values at the two temperature ranges may be optimized based on cost, availability, environmental concerns, efficiency, and the like, without departing from the scope of the present disclosure.

To further optimize the selected HIS or HIS mixture type and concentration, the NAC model may be employed to determine the maximum water-in-oil solubility with the least amount of HIS or HIS mixture required (e.g., to minimize costs). The NAC model provides the link between solubility and concentration that may be used to further optimize the selected HIS or HIS mixture for use in inhibiting gas hydrate formation in the production systems described herein, thereby determining an optimal concentrated HIS or HIS mixture. The NAC model may be employed using Equation 8 below:

$$V_m = V_o - \frac{A_s + R_w}{3}, \qquad \text{Equation 8}$$

where $V_m$ is the volume of emulsion produced, $A_s$ is the HIS (or HIS mixture) interfacial area and is $A_s$ is calculated according to Equation 9 below, and $R_w$ is the radius of the aggregates of water in the aqueous phase of the HIS (or HIS mixture) and is calculated according to Equation 10 below:

$$A_s = \Sigma_i C_{si} * V_o * 6.023 * 10^{23} * a_{si} \qquad \text{Equation 9,}$$

where $C_{si}$ the HIS concentration of the fraction of the $i^{th}$ HIS component, $V_o$ is the volume of oil phase of the produced hydrocarbon fluid, and $a_{si}$ is the surface area per molecule of the HIS of the $i^{th}$ HIS component (dependent on the type of HIS). $R_w$ is calculated from Equation 11 below:

$$\left|\frac{1}{R_o}\right| - \left|\frac{1}{R_w}\right| = -\frac{HLD}{L}, \qquad \text{Equation 10}$$

where L is the length scaling parameter proportional to the extended length of the surfactant tail (lipophilic) group of the HIS, and $R_o$ is the radius of the aggregates of oil in the oil phase of the HIS (or HIS mixture) and is calculated according to Equation 11 below:

$$R_o = \frac{3 * V_o}{A_s}. \qquad \text{Equation 11}$$

After identification of the optimal HIS or HIS mixture for use in inhibiting gas hydrate formation in a production system, the HIS or HIS mixture may be included at any point in the production system to operate accordingly. For example, the HIS or HIS mixture may be introduced into a wellbore downhole, or a pipeline located sub-surface, where under such operational conditions, it will be in the form of a water-in-oil morphological phase. Advantageously, the same HIS or HIS mixture may also be introduced into a production system at a surface location, such as a storage container where the produced hydrocarbon fluid is static, and form an oil-water separation morphological phase without making any changes to the HIS or HIS mixture and amount to include therein.

Figure 2:
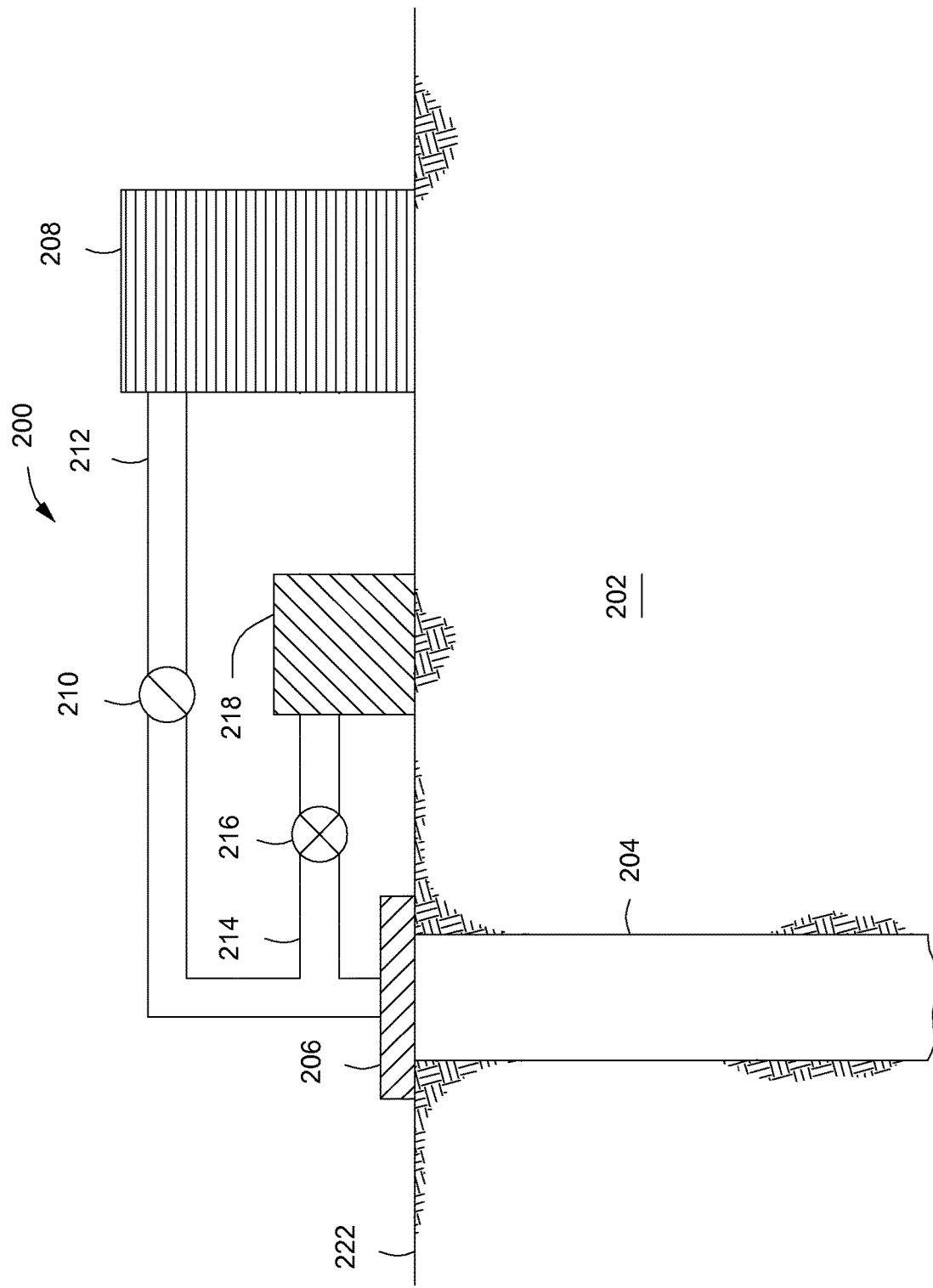
FIG. 2 provides an illustration of a production system suitable for use in conjunction with the methods described herein.

Referring now to FIG. 2, illustrated is a portion of a production system 200 for producing fluids from a subterranean formation 202, according to one or more embodiments of the present disclosure. The production system 200 includes a wellbore 204 penetrating the subterranean formation 202 with a wellhead 206 where the produced bulk fluid exits the wellbore 204 (which may be cased or uncased) to the surface 222. The produced fluid may then be conveyed to a storage container 208 (e.g., a tank or a tanker truck, which may convey the produced fluid elsewhere, such as for transport in a subsurface pipeline) via a main tubular 212 with a pump 210 (if needed). As illustrated, in some embodiments, the produced fluids from the subterranean formation 202 may be sampled using a sampling tubular 214 (e.g., a tube, a hose, and the like). The sampling tubular 214 may be in fluid communication with the main tubular 212 and a valve 216 may be arranged on the sampling tubular 216 to have an open or closed position. When the valve 216 is in the open position, produced fluid may flow through the sampling tubular 216 and into a sample chamber 218, where samples of the produced fluid may be taken for use in designing an optimal HIS or HIS mixture, as described herein. In some embodiments, the sample chamber 218 may additionally be in fluid contact with the storagecontainer 208, where the sampled produced fluids that were not used may be introduced into the storage container 208.

Although sampling of the produced fluid is described with reference to FIG. 2 from the sampling chamber 218, sampling of the produced fluid may also be taken from the storage container 208, without departing from the scope of the present disclosure. Moreover, sampling of the produced fluid may be at any other location along the main tubular 212 or any location not illustrated in FIG. 2 that form part of a production system as described herein, without departing from the scope of the present disclosure.

After an optimal HIS or HIS mixture has been identified, the optimal HIS or HIS mixture may be introduced in the produced fluid at any location in the production system 200 to inhibit gas hydrate formation, including, but not limited to the wellbore 204, the main tubular 212, the storage container 208, and the like. Moreover, the HIS or HIS mixture may be introduced into the produced fluid at any other location not illustrated in FIG. 2 that form part of a production system as described herein (e.g., a subsurface pipeline), without departing from the scope of the present disclosure.

It should also be noted that the various drawings provided herein are not necessarily drawn to scale nor are they, strictly speaking, depicted as optically correct as understood by those skilled in optics. Instead, the drawings are merely illustrative in nature and used generally herein in order to supplement understanding of the systems and methods provided herein. Indeed, while the drawings may not be optically accurate, the conceptual interpretations depicted therein accurately reflect the exemplary nature of the various embodiments disclosed.

Embodiments herein include:

Embodiment A: A method comprising: producing a bulk fluid from a subterranean formation, the bulk fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) or nonionic surfactant characteristic curvature ($C_{cn}$); sampling a portion of the bulk fluid, thereby forming at least one sampled fluid; determining constituent parameters of the sampled fluid using the hydrophilic-lipophilic deviation (HLD) model according to Equation A for ionic surfactant compositions and Equation B for nonionic surfactant compositions:

$$HLD = \ln(S) - k*EACN + c_c - \alpha_T(T-25°\text{ C.})\quad\text{Equation A}$$

$$HLD = b(S) - k*EACN + c_{cn} - c_T(T-25°\text{ C.})\quad\text{Equation B,}$$

where S is salinity of sampled fluid; b is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $c_T$ is a surfactant temperature constant for the nonionic surfactant composition; and determining an optimal hydrate inhibitor surfactant (HIS) or HIS mixture to achieve a first oil-water separation morphological phase of the sampled fluid at temperatures above about 10° C. and a first water-in-oil morphological phase of the sampled fluid at temperatures below about 5° C.

Embodiment A may have one or more of the following additional elements in any combination:

Element A1: Wherein the step of determining at least one of the constituent parameters using Equation A or Equation B comprises employing a method selected from the group consisting of a surfactant-surfactant method, a surfactant-oil method, a salinity method, and any combination thereof.

Element A2: Wherein the optimal HIS or HIS mixture achieves the first oil-water separation morphological phase of the sampled fluid at temperatures in the range of about 10° C. to about 50° C.

Element A3: Wherein the optimal HIS or HIS mixture achieves the first water-in-oil morphological phase of the sampled fluid at temperatures in the range of about 5° C. to about −25° C.

Element A4: Further comprising introducing the optimal HIS or HIS mixture into the bulk fluid to achieve a second oil-water separation morphological phase of the bulk fluid at temperatures above about 10° C. and a second water-in-oil morphological phase of the bulk fluid at temperatures below about 5° C.

Element A5: Further comprising introducing the optimal HIS or HIS mixture into the bulk fluid to achieve a second oil-water separation morphological phase of the bulk fluid at temperatures above about 10° C. and a second water-in-oil morphological phase of the bulk fluid at temperatures below about 5° C., wherein the optimal HIS or HIS mixture achieves the second oil-water separation morphological phase of the bulk fluid at temperatures in the range of about 10° C. to about 50° C.

Element A6: Further comprising introducing the optimal HIS or HIS mixture into the bulk fluid to achieve a second oil-water separation morphological phase of the bulk fluid at temperatures above about 10° C. and a second water-in-oil morphological phase of the bulk fluid at temperatures below about 5° C., wherein the optimal HIS or HIS mixture achieves the second water-in-oil morphological phase of the bulk fluid at temperatures in the range of about 5° C. to about −25° C.

Element A7: Further comprising introducing the optimal HIS or HIS mixture into the bulk fluid to achieve a second oil-water separation morphological phase of the bulk fluid at temperatures above about 10° C. and a second water-in-oil morphological phase of the bulk fluid at temperatures below about 5° C., wherein the optimal HIS or HIS mixture introduced into the bulk fluid inhibits the formation of gas hydrates.

Element A8: Further comprising introducing the optimal HIS or HIS mixture into the bulk fluid to achieve a second oil-water separation morphological phase of the bulk fluid at temperatures above about 10° C. and a second water-in-oil morphological phase of the bulk fluid at temperatures below about 5° C., wherein the optimal HIS or HIS mixture is introduced into the bulk fluid in a portion of a production system.

Element A9: Further comprising introducing the optimal HIS or HIS mixture into the bulk fluid to achieve a second oil-water separation morphological phase of the bulk fluid at temperatures above about 10° C. and a second water-in-oil morphological phase of the bulk fluid at temperatures below about 5° C., wherein the optimal HIS or HIS mixture is introduced into the bulk fluid in a portion of a production system, and wherein the portion of the production system is selected from the group consisting of a wellbore, a storage container, a tubular, a flow line, a pipeline, and any combination thereof.

By way of non-limiting example, exemplary combinations applicable to A include: A with A1 and A2; A with A1 and A3; A with A1 and A4; A with A1 and A5; A with A1 and A6; A with A1 and A7; A with A1 and A8; A with A1 and A9; A with A2 and A3; A with A2 and A4; A with A2 and A5; A with A2 and A6; A with A2 and A7; A with A2 and A8; A with A2 and A9; A with A3 and A4; A with A3 and A5; A with A3 and A6; A with A3 and A7; A with A3 and A8; A with A3 and A9; A with A4 and A5; A with A4 and A6; A with A4 and A7; A with A4 and A8; A with A4 and A9; A with A5 and A6; A with A5 and A7; A with A5 and A8; A with A5 and A9; A with A6 and A7; A with A6 and A8; A with A6 and A9; A with A7 and A8; A with A7 and A9; A with A8 and A9; A with A1, A2, A3, A4, A5, A6, A7, A8, and A9; A with A1, A2, A3, A4, A5, and A6; A with A1, A4, and A6; A with A3, A4, and A5; and the like.

Embodiment B: A method comprising: producing a bulk fluid from a subterranean formation, the bulk fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) or nonionic surfactant characteristic curvature ($C_{cn}$); sampling a portion of the bulk fluid, thereby forming at least one sampled fluid;

determining constituent parameters of the sampled fluid using the hydrophilic-lipophilic deviation (HLD) model according to Equation A for an ionic surfactant composition and Equation B for a nonionic surfactant composition:

$$HLD = \ln(S) - k*EACN + c_c - \alpha_T(T - 25°\ C.) \qquad \text{Equation A}$$

$$HLD = b(S) - k*EACN + c_{cn} - c_T(T - 25°\ C.) \qquad \text{Equation B,}$$

where S is salinity of sampled fluid; b is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $c_T$ is a surfactant temperature constant for the nonionic surfactant composition; determining an optimal hydrate inhibitor surfactant (HIS) or HIS mixture to achieve an oil-water separation morphological phase of the sampled fluid at temperatures above about 10° C. and a water-in-oil morphological phase of the sampled fluid at temperatures below about 5° C.; and determining an optimal concentration of the determined optimal HIS or HIS mixture using the Net-Average Curvature (NAC) model, according to Equation C:

$$V_m = V_o - \frac{A_s * R_w}{3}, \qquad \text{Equation C}$$

where $V_m$ is a volume of an emulsion in the oil-water separation morphological phase of the sampled fluid at temperatures above about 25° C. or the water-in-oil morphological phase of the sampled fluid at temperatures below about 25° C.; $A_s$ is an interfacial area of the optimal HIS or HIS mixture; and $R_w$ is a radius of water aggregates in the optimal HIS or HIS mixture, thereby determining an optimal concentrated HIS or HIS mixture.

Embodiment B may have one or more of the following additional elements in any combination:

Element B1: Wherein the step of determining at least one of the constituent parameters using Equation A or Equation B comprises employing a method selected from the group consisting of a surfactant-surfactant method, a surfactant-oil method, a salinity method, and any combination thereof.

Element B2: Wherein the optimal HIS or HIS mixture achieves the first oil-water separation morphological phase of the sampled fluid at temperatures in the range of about 10° C. to about 50° C.

Element B3: Wherein the optimal HIS or HIS mixture achieves the first water-in-oil morphological phase of the sampled fluid at temperatures in the range of about 5° C. to about −25° C.

Element B4: Further comprising introducing the optimal concentrated HIS or HIS mixture into the bulk fluid to achieve a second oil-water separation morphological phase of the bulk fluid at temperatures above about 10° C. and a second water-in-oil morphological phase of the bulk fluid at temperatures below about 5° C.

Element B5: Further comprising introducing the optimal concentrated HIS or HIS mixture into the bulk fluid to achieve a second oil-water separation morphological phase of the bulk fluid at temperatures above about 10° C. and a second water-in-oil morphological phase of the bulk fluid at temperatures below about 5° C., wherein the optimal concentrated HIS or HIS mixture achieves the second oil-water separation morphological phase of the bulk fluid at temperatures in the range of about 10° C. to about 50° C.

Element B6: Further comprising introducing the optimal concentrated HIS or HIS mixture into the bulk fluid to achieve a second oil-water separation morphological phase of the bulk fluid at temperatures above about 10° C. and a second water-in-oil morphological phase of the bulk fluid at temperatures below about 5° C., wherein the optimal concentrated HIS or HIS mixture achieves the second waterin-oil morphological phase of the bulk fluid at temperatures in the range of about 5° C. to about −25° C.

Element B7: Further comprising introducing the optimal concentrated HIS or HIS mixture into the bulk fluid to achieve a second oil-water separation morphological phase of the bulk fluid at temperatures above about 10° C. and a second water-in-oil morphological phase of the bulk fluid at temperatures below about 5° C., wherein the optimal concentrated HIS or HIS mixture introduced into the bulk fluid inhibits the formation of gas hydrates.

Element B8: Further comprising introducing the optimal concentrated HIS or HIS mixture into the bulk fluid to achieve a second oil-water separation morphological phase of the bulk fluid at temperatures above about 10° C. and a second water-in-oil morphological phase of the bulk fluid at temperatures below about 5° C., wherein the optimal concentrated HIS or HIS mixture is introduced into the bulk fluid in a portion of a production system.

Element B9: Further comprising introducing the optimal concentrated HIS or HIS mixture into the bulk fluid to achieve a second oil-water separation morphological phase of the bulk fluid at temperatures above about 10° C. and a second water-in-oil morphological phase of the bulk fluid at temperatures below about 5° C., wherein the optimal concentrated HIS or HIS mixture is introduced into the bulk fluid in a portion of a production system, and wherein the portion of the production system is selected from the group consisting of a wellbore, a storage container, a tubular, a flow line, a pipeline, and any combination thereof.

By way of non-limiting example, exemplary combinations applicable to B include: B with B1 and B2; B with B1 and B3; B with B1 and B4; B with B1 and B5; B with B1 and B6; B with B1 and B7; B with B1 and B8; B with B1 and B9; B with B2 and B3; B with B2 and B4; B with B2 and B5; B with B2 and B6; B with B2 and B7; B with B2 and B8; B with B2 and B9; B with B3 and B4; B with B3 and B5; B with B3 and B6; B with B3 and B7; B with B3 and B8; B with B3 and B9; B with B4 and B5; B with B4 and B6; B with B4 and B7; B with B4 and B8; B with B4 and B9; B with B5 and B6; B with B5 and B7; B with B5 and B8; B with B5 and B9; B with B6 and B7; B with B6 and B8; B with B6 and B9; B with B7 and B8; B with B7 and B9; B with B8 and B9; B with B1, B2, B3, B4, B5, B6, B7, B8, and B9; B with B1, B3, B5, B6, B8, and B9; B with B1, B7, and B9; B with B2, B3, and B5; and the like.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein.

Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
producing a bulk fluid from a subterranean formation, the bulk fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) or nonionic surfactant characteristic curvature ($C_{cn}$);
sampling a portion of the bulk fluid, thereby forming at least one sampled fluid;
determining constituent parameters of the sampled fluid using the hydrophilic-lipophilic deviation (HLD) model according to Equation A for ionic surfactant compositions and Equation B for nonionic surfactant compositions:

$$HLD=\ln(S)-k*EACN+c_c-\alpha_T(T-25°\ C.) \quad \text{Equation A}$$

$$HLD=b(S)-k*EACN+c_{cn}-c_T(T-25°\ C.) \quad \text{Equation B,}$$

where S is salinity of sampled fluid; b is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $c_T$ is a surfactant temperature constant for the nonionic surfactant composition;
determining an optimal hydrate inhibitor surfactant (HIS) or HIS mixture from the determined constituent parameters of the sampled fluid; and
introducing the HIS or HIS mixture into the sampled fluid to achieve a first oil-water separation morphological phase of the sampled fluid at temperatures above 10±0.5° C. and a first water-in-oil morphological phase of the sampled fluid at temperatures below 5±0.25° C., wherein the HIS or HIS mixture inhibits the formation of gas hydrates in the sampled fluid.

2. The method of claim 1, wherein the step of determining at least one of the constituent parameters using Equation A or Equation B comprises employing a method selected from the group consisting of a surfactant-surfactant method, a surfactant-oil method, a salinity method, and any combination thereof.

3. The method of claim 1, wherein the optimal HIS or HIS mixture achieves the first oil-water separation morphological phase of the sampled fluid at temperatures in the range of 10±0.5° C. to 50±2.5° C.

4. The method of claim 1, wherein the optimal HIS or HIS mixture achieves the first water-in-oil morphological phase of the sampled fluid at temperatures in the range of 5±0.25° C. to 25±1.25° C.

5. The method of claim 1, further comprising introducing the optimal HIS or HIS mixture into the bulk fluid to achieve a second oil-water separation morphological phase of the bulk fluid at temperatures above 10±0.5° C. and a second water-in-oil morphological phase of the bulk fluid at temperatures below 5±0.25° C.

6. The method of claim 5, wherein the optimal HIS or HIS mixture achieves the second oil-water separation morphological phase of the bulk fluid at temperatures in the range of 10±0.5° C. to 50±2.5° C.

7. The method of claim 5, wherein the optimal HIS or HIS mixture achieves the second water-in-oil morphological phase of the bulk fluid at temperatures in the range of 5±0.25° C. to 25±1.25° C.

8. The method of claim 5, wherein the optimal HIS or HIS mixture introduced into the bulk fluid inhibits the formation of gas hydrates.

9. The method of claim 5, wherein the optimal HIS or HIS mixture is introduced into the bulk fluid in a portion of a production system.

10. The method of claim 9, wherein the portion of the production system is selected from the group consisting of a wellbore, a storage container, a tubular, a flow line, a pipeline, and any combination thereof.

11. A method comprising:
producing a bulk fluid from a subterranean formation, the bulk fluid comprising at least water and a hydrocarbon, and having constituent parameters selected from the group consisting of salinity (S), water volume ($W_p$), hydrocarbon concentration (x), equivalent alkane carbon number (EACN), surfactant concentration y, and ionic surfactant characteristic curvature ($C_c$) or nonionic surfactant characteristic curvature ($C_{cn}$);
sampling a portion of the bulk fluid, thereby forming at least one sampled fluid;
determining constituent parameters of the sampled fluid using the hydrophilic-lipophilic deviation (HLD) model according to Equation A for an ionic surfactant composition and Equation B for a nonionic surfactant composition:

$$HLD = \ln(S) - k*EACN + c_c - \alpha_T(T - 25° C.)$$  Equation A $$HLD = b(S) - k*EACN + c_{cn} - c_T(T - 25° C.)$$  Equation B, where S is salinity of sampled fluid; b is a salinity constant; EACN is equivalent alkane carbon number for the hydrocarbon in the sampled fluid; T is temperature of the sampled fluid; $c_c$ is characteristic curvature for the ionic surfactant composition; $c_{cn}$ is characteristic curvature for the nonionic surfactant composition; $\alpha_T$ is a surfactant temperature constant for the ionic surfactant composition; and $c_T$ is a surfactant temperature constant for the nonionic surfactant composition;
determining an optimal hydrate inhibitor surfactant (HIS) or HIS mixture from the determined constituent parameters of the sampled fluid;
determining an optimal concentration of the determined optimal HIS or HIS mixture using the Net-Average Curvature (NAC) model, according to Equation C:

$$V_m = V_o - \frac{A_s * R_w}{3},$$  Equation C where $V_m$ is a volume of an emulsion in the oil-water separation morphological phase of the sampled fluid at temperatures above 25±1.25° C. or the water-in-oil morphological phase of the sampled fluid at temperatures below 25±1.25° C.; $A_s$ is an interfacial area of the optimal HIS or HIS mixture; and $R_w$ is a radius of water aggregates in the optimal HIS or HIS mixture, thereby determining an optimal concentrated HIS or HIS mixture; and
introducins the optimal concentrated HIS and HIS mixture into the sampled fluid to achieve an oil-water separation morphological phase of the sampled fluid at temperatures above 10±0.5°C., and a water-in-oil morphological phase of the sampled fluid at temperatures below 5±0.25°C., wherein the optimal concentrated HIS or HIS mixture inhibits the formation of gas hydrates in the sampled fluid.

12. The method of claim 11, wherein the step of determining at least one of the constituent parameters using Equation A or Equation B comprises employing a method selected from the group consisting of a surfactant-surfactant method, a surfactant-oil method, a salinity method, and any combination thereof.

13. The method of claim 11, wherein the optimal HIS or HIS mixture achieves the first oil-water separation morphological phase of the sampled fluid at temperatures in the range of 10±0.5° C. to 50±2.5° C.

14. The method of claim 11, wherein the optimal HIS or HIS mixture achieves the first water-in-oil morphological phase of the sampled fluid at temperatures in the range of 5±0.25° C. to 25±1.25° C.

15. The method of claim 11, further comprising introducing the optimal concentrated HIS or HIS mixture into the bulk fluid to achieve a second oil-water separation morphological phase of the bulk fluid at temperatures above 10±0.5° C. and a second water-in-oil morphological phase of the bulk fluid at temperatures below 5±0.25° C.

16. The method of claim 15, wherein the optimal concentrated HIS or HIS mixture achieves the second oil-water separation morphological phase of the bulk fluid at temperatures in the range of 10±0.5° C. to 50±2.5° C.

17. The method of claim 15, wherein the optimal concentrated HIS or HIS mixture achieves the second water-in-oil morphological phase of the bulk fluid at temperatures in the range of 5±0.25° C. to 25±1.25° C.

18. The method of claim 15, wherein the optimal concentrated HIS or HIS mixture introduced into the bulk fluid inhibits the formation of gas hydrates.

19. The method of claim 15, wherein the optimal concentrated HIS or HIS mixture is introduced into the bulk fluid in a portion of a production system.

20. The method of claim 19, wherein the portion of the production system is selected from the group consisting of a wellbore, a storage container, a tubular, a flow line, a pipeline, and any combination thereof.

* * * * *